Sept. 29, 1964

C. M. LONG ETAL 3,151,068

WATER BORNE DEBRIS REMOVER

Filed Aug. 7, 1962

CHARLES M. POISEL
CHARLES M. LONG, DECEASED.
INVENTORS
BY: AMY E. POISEL,
ADMINISTRATRIX

BY Rommel, Allen & Rommel
ATTORNEYS

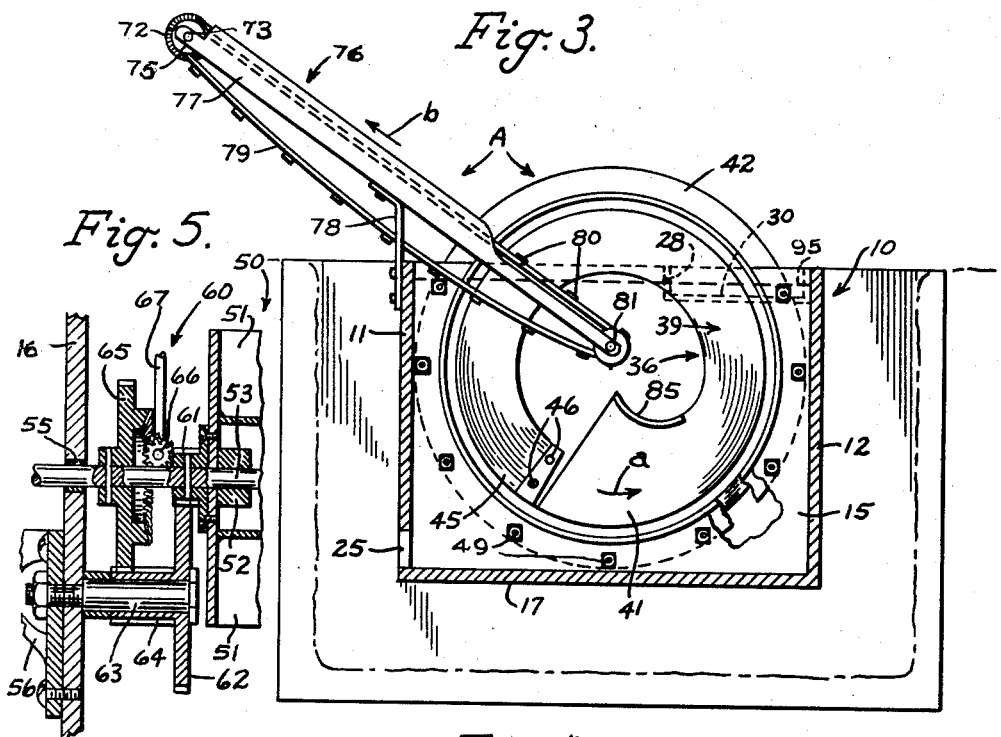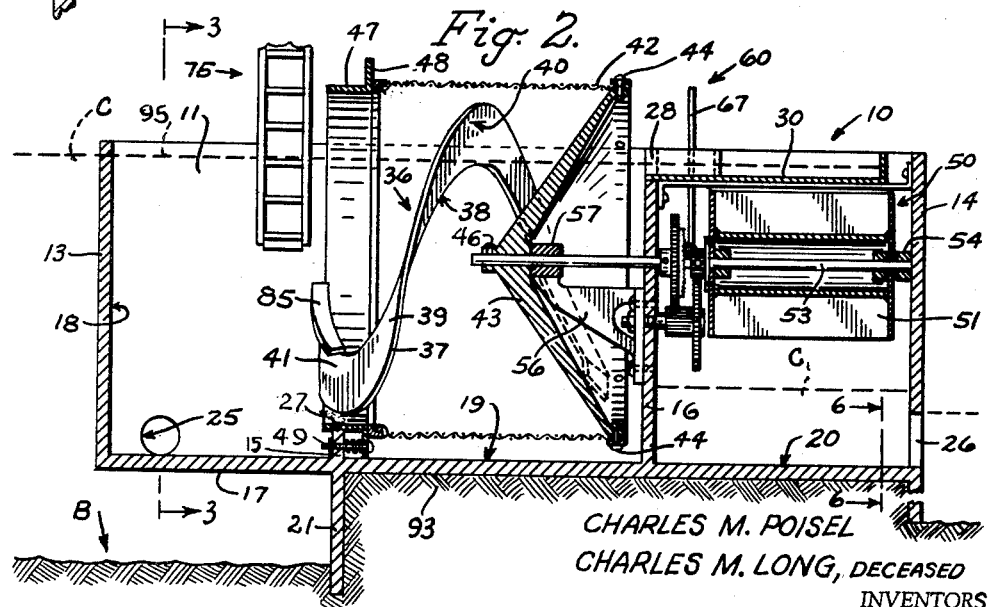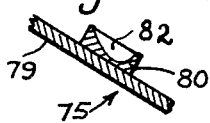

United States Patent Office 3,151,068
Patented Sept. 29, 1964

3,151,068
WATER BORNE DEBRIS REMOVER
Charles M. Long, deceased, late of Granger, Wash., by Amy E. Poisel, administratrix, Granger, Wash., and Charles M. Poisel, Rte. 3, Wapato, Wash.; said Amy E. Poisel, administratrix of Charles M. Long, deceased, assignor to said Charles M. Poisel
Filed Aug. 7, 1962, Ser. No. 216,272
5 Claims. (Cl. 210—156)

This invention relates to debris-removing apparatus interposed in the flow of a stream and operated thereby.

An important object of this invention is to provide an apparatus, so constructed and arranged that small-sized debris such as weed and other seeds and bits of moss or fragments and small roots, for example, will be removed from the stream in which the apparatus is interposed, and will be carried to a location, removed from the stream, where they may be deposited.

Another important object is to provide apparatus as above, including a rotating drum or tube which contains means for skimming off floating small-sized debris, such as weed seeds, bits of moss, roots and like debris which are exceedingly difficult to remove from a flowing stream.

Still another important object is to provide apparatus as described, in which the skimming means is a substantially smooth-surfaced worm free of such projections or walls which would tend to retain the debris against automatic removal from the skimming means. Instead, a flange, forming part of the skimming means, in conjunction with a free end portion of a rigid helical strip or elongate plate, traps the small-sized debris as it floats on or near the surface of the water and then causes it to fall upon a conveyor means for discharge at a location remote from the stream.

Yet another important object is to provide an arrangement of water intake port with reference to the housing wall of the apparatus, which tends to prevent undesirable rapid or turbulent flow of the water into the apparatus and, in conjunction with portions of the walls and bank of the stream channel or ditch into which the apparatus is introduced, provides for the trapping and accumulation of heavy or bulky debris exterior of the apparatus so that this debris will not damage the apparatus.

Still another important object is to provide a small-sized debris skimmer means operated by a waterwheel means which is, in turn, operated by the flowing stream from which the debris are removed.

Other objects and advantages of the invention will be apparent during the course of the following detailed description of the invention, taken in connection with the accompanying drawings forming parts of this disclosure, and in which drawings:

FIG. 2 is a vertical sectional view, substantially on the line 2—2 of FIG. 1.

FIG. 3 is a vertical sectional view, substantially on the line 3—3 of FIG. 1.

FIG. 5 is a sectional view, on an enlarged scale over that of FIG. 2, showing details of transmission means of the apparatus.

FIG. 7 is a fragmentary vertical sectional view, substantially on the line 7—7 of FIG. 1.

In the drawings, wherein similar reference characters designate corresponding parts throughout the several views, the letter A designates a preferred embodiment of the apparatus, B, a bed or channel; and C the body of water, as a stream within the bed or channel.

Figure 1:
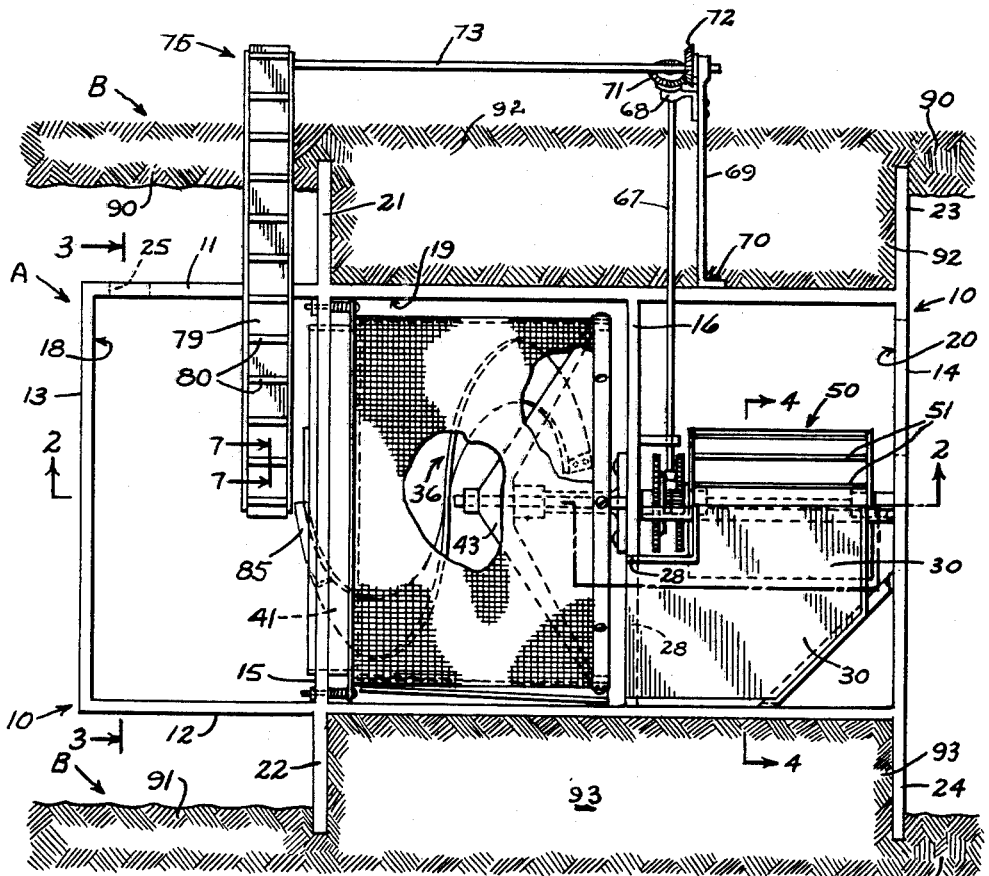
FIG. 1 is a top plan of a preferred embodiment of the invention, disposed in a stream with banks at the sides of the stream.

The apparatus A includes a housing 10 having substantially parallel side walls 11 and 12, substantially parallel exterior end walls 13 and 14, and interior end walls or partitions 15 and 16, with a bottom wall 17. Portions of the walls 11 and 12 with the walls 13 and 15 and a portion of the wall 17 define an upwardly-opening first compartment 18, portions of the walls 11 and 12 with the walls 15 and 16 and another portion of the wall 17, define an upwardly-opening second or intermediate compartment 19, and portions of the walls 11 and 12, with the walls 14 and 16 and a third portion of the wall 17 define a preferably upwardly-opening third compartment 20. Outward extensions 21 and 22 of the wall 15 and outward extensions 23 and 24 of the wall 14 provide rigid wings for securing or anchoring the housing 10 to the sides or banks of the bed or channel B, as is believed obvious in FIG. 1.

Figure 6:
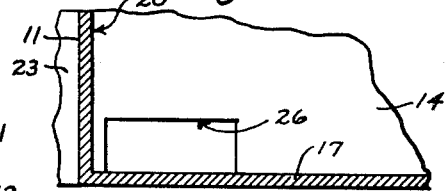
FIG. 6 is a fragmentary elevational view substantially on the line 6—6 of FIG. 2.

The wall 11 is shown as provided with a water intake port 25 (FIGS. 2 and 3) which is preferably disposed immediately above the bottom wall 17 and adjacent the wall 13 and is adapted to admit the flow of water into the compartment 18 to rise therein. The walls 12 and 13 are preferably without openings, but the wall 14 is provided with a skimmed water outlet port 26 (FIGS. 2 and 6) which may be disposed adjacent the wall 11 and relatively close to the bottom wall 17. This port is preferably rectangular, while the port 25 may be circular and smaller than the port 26. The port 26 discharges from the compartment 20.

The interior or partition wall 15 is provided with a relatively large opening 27 (FIG. 2) which is arcuate in shape and is adapted to contain an edge portion of an open-ended foraminous drum 42 to be later described, and which is contained in the compartment 19.

As for the interior or partition wall 16, the same is provided with a cutout 28 (FIGS. 1 and 2) extending downwardly from the upper edge of the wall 13. The cutout 28 provides for overflow of water from the compartment 19 into the compartment 20, and maintains the water level (indicated at 95) below the upper edge of the compartment 18.

The locations and sizes of the port 25 and the cutout 28 have been found to be, after considerable experimentation, as most desirable for a non-turbulent flow of water into the compartments 18 and 19, but the flow from the compartment 19 through the cutout 27 is upon and over a substantially horizontally disposed baffle 30 (FIGS. 1 and 4) secured, as by conventional fasteners 31, as screws or bolts, to the walls 12 and 14. From the free edge of the baffle, the water descends upon the blades of a waterwheel 50 to be subsequently described, whereby the waterwheel will be rotated by the force of the descending water.

The means 35 for removing or skimming debris from the water flowing into the compartment 18 and thence through the large opening 27 is an important part of the apparatus. As best shown in FIGS. 1, 2 and 3, this means 35 comprises an elongate member or skimmer 36 in the form of an elongate helix or circumvolution, consisting of an initially flat strip of suitable material, preferably iron, steel, aluminum or the like, having edges 37 and 38, two faces 39 and 40, and having enough rigidity to be formed into the helix or circumvolution and remain in such shape. For example, the strip is of substantial width, and may be 10 inches wide, but preferably wider and the free end portion 41 thereof is provided with a flange 85, extending from the face 39 at the edge 38 and preferably normal to the face 39 as may be appreciated from FIGS. 2 and 3. Preferably, the skimmer 36 is spaced with its edge 37 several inches from the inner periphery of a foraminous drum 42, open at its end facing the wall 13, but closed at its end facing the wall 16, by a preferably conical wall 43 secured to the drum body as by suitable fasteners 44. The inner end portion 45 of the skimmer 36 may be secured to the wall 43 as by fastener means 46, such as rivets.

It will be noted, such as in FIGS. 2 or 3, that the drum extends above the horizontal planes of the upper edges of the walls of the housing 10 and, consequently, above the level of the water flowing through the apparatus A.

In order to retain the drum 42 against axial canting, a guide ring 47 having a flange portion 48 adapted to lightly contact the inner periphery of the drum. This ring 47 may be secured to the wall 13 at the opening 27 in any suitable way, such as by nut and bolt assemblies 49.

Figure 4:
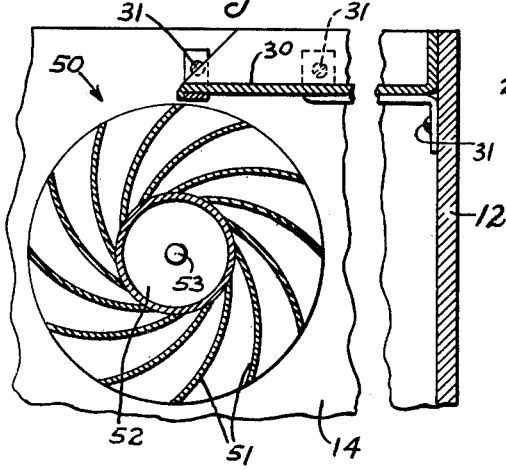
FIG. 4 is a vertical sectional view, substantially on the line 4—4 of FIG. 1.

The waterwheel 50, shown in FIGS. 1, 2 and 4, is of conventional watershot construction, with blades 51 constructed and arranged to receive the impact of the water flowing downwardly from the baffle 30. The hub 52, from which the blades 51 project, is fixedly secured to a shaft 53 journalled in bearing 54 carried by the wall 14, and in bearing 55 (FIG. 5) carried by the wall 16 with the shaft extending into the compartment 19 and fixed to the conical wall 43, being supported, in the compartment, by a suitable bracket 56 having a bearing for the shaft 53. Means 60 for movement of a conveyor means 76 is shown mostly in FIGS. 1 and 5 and includes a first gear wheel 61 keyed to the shaft 53, with its teeth in mesh with those of a second gear wheel 62, greater in diameter than that of the wheel 61 mounted for rotation upon a stub shaft 63 and fixedly secured to a third or smaller-diametered gear wheel 64, also rotatable on the stub shaft, with the teeth of the wheel 64 in mesh with those of a fourth or relatively large gear wheel 65 fixedly mounted on the shaft 53 and which gear wheel 65 has bevel gear teeth in a side wall thereof which mesh with the teeth of a fifth or small bevel gear wheel 66 mounted upon an elongate upwardly and outwardly extending shaft 67 extending, at its outer end portion, through bearing 68 carried by a bracket 69 supported by the wall 11 as shown in FIG. 1, as by a suitable fastener 70, as a bolt and nut assembly. Fixedly mounted upon the upper end poriton of the shaft 67 is a sixth or small bevel gear wheel 71, meshing with a seventh or small bevel gear wheel 72, fixed to a substantially horizontally-disposed shaft 73 journalled at one end portion in a bearing carried by the bracket 69 and extending to a conveyor drum 75 of a conveyor means 76, next to be described.

The drum 75 of the conveyor means 76 is rotatably carried by the shaft 73 which is rotatably supported by a downward and inwardly projecting bracket 77 which is, in turn, supported by a bracket 78 carried by the wall 11. Over the drum 75 is trained a conveyor belt or chain 79 upon which is mounted a plurality of spaced apart flights 80. The belt is also trained over a second drum 81 rotatably mounted on the bracket 77 at the lower end portion thereof.

It is preferred to provide the flights 80 with somewhat spoon-shaped depressions, as shown in FIG. 7, in order to better retain the seeds, moss and the like. From FIGS. 1, 2 and 3, the location of the lower end portion of the conveyor belt 79, with reference to the flange 85 of the skimmer 40 will be apparent, whereby debris discharged from the flange will be projected upon the conveyor belt, due to centrifugal action as the skimmer rotates.

The apparatus A is adapted to be disposed crosswise the stream bed or channel B (which may be an irrigation ditch) with the apparatus secured in place by burying the outward extensions 21 to 24 inclusive in the banks 90 and 91 of the bed or channel, with the banks enlarged with fills, as at 92 and 93. The inlet port 25 is, of course, open for the flow of water, which will gradually fill the compartment 18 carrying the debris upwardly, to float upon or slightly below the surface 95. From the compartment 19, the water will flow through the guide ring 47, through the openings in the wall of the drum 42 and fill the compartment 15, whereupon it will flow through the cutout 28, over the baffle 30 and, falling upon the blades 51 of the water wheel 50, will set the latter rotating which will, in turn, cause rotation of the drum 42, skimmer 36 and conveyor means 76, finally flowing into the bed or channel through the outlet port 26.

As the skimmer 36 rotates counterclockwise, as indicated by the arrow a in FIG. 3, it will set up eddies tending to prevent seeds, moss and like debris from moving directly into the mouth of the ring 47 but, instead, into the path of the flange 85 of the skimmer so that they will be caught up upon the face 39 of the free end portion 41 of the skimmer and retained by the flange until, with further rotation of the skimmer, they will fall, by gravity and centrifugal force, upon the conveyor means to be caught by the hollows 81 of the flights 80, carried upwardly and outwardly (as indicated by the arrow b in FIG. 3), and dumped either upon the bank 90 or into a suitable container (not shown).

By the arrangement whereby the intake port 25, while upstream, is adjacent the bottom wall 17 of the apparatus, it is not in the direct path of the flow of the water, and being relatively small in diameter, large debris which might tend to damage the skimmer structure, cannot enter the apparatus, but may accumulate in the pocket defined by the extension 21, and portions of the wall 11, and bank 90 and may be manually removed. This pocket is mainly down stream with reference to the horizontal plane of the intake port, as may be appreciated from FIG. 1. As has been explained previously, the location and size of the intake port also prevents a rush of water past the skimmer or a turbulence thereof in the compartment 18 which would prevent efficient operation of the skimmer.

By the term "small-sized debris" is meant debris such as weed and other seeds, fragments of moss, small plant roots which would be apt to take root in the stream channel, and the like.

Various changes may be made to the form of the invention herein shown without departing from the spirit of the invention or scope of the claims.

What is claimed is:

1. Apparatus for interposition in the flow of a body of water within a channel for removing small-sized debris from said water, said apparatus including a housing positioned in said channel to direct all of the flow through the housing and having an outer upstream facing wall, an outer downstream facing wall, outer side walls facing the sides of said channel, a first partition wall facing said upstream facing wall, a second partition wall facing said downstream facing wall, and a bottom wall, said upstream facing wall and first partition wall and portions of said side and bottom walls defining a first compartment, said partition walls and portions of said side and bottom walls defining a second compartment, and said second partition wall and downstream facing wall and portions of said side and bottom walls defining a third compartment, one of the outer side walls of said first compartment having an intake port adjacent the bottom thereof, opening into said first compartment for passage therethrough of water and small-sized debris only, one of the outer walls of said third compartment having a water exit port, and each of said first and second partition walls having a water-flow opening; skimmer means in said first and second compartments and extending through said water-flow opening in said first partition wall for removing small-sized debris from the water from said first compartment; and operating means in said third compartment connected with said skimmer means for operation of said skimmer means.

2. Apparatus according to claim 1 characterized in that said operating means is operated by flow of water into and through said third compartment from said second compartment, by way of said water-flow opening in said second partition wall, and out of said exit port.

3. Apparatus according to claim 1 characterized in that said skimmer means includes an elongated rotatable helical member, operatively connected at one end portion with said operating means and extending through said second compartment and through said opening in said first partition wall with its other end portion within said first compartment and provided with a face having an inner edge and a flange extending along at least a portion of said edge and with its transverse axis extending toward said outer upstream facing wall, whereby upon rotation of said helical member, said flange and said face will sweep upwardly small debris from the water within said first compartment; and conveyor means is included extending into said first compartment and in juxtaposition to said flange to receive small debris swept by said flange and face and convey the swept debris out of said housing.

4. Apparatus according to claim 3 characterized in that said operating means is operatively connected with said conveyor means and operates said conveyor means.

5. In combination with a body of flowing water and a channel through which said body flows, said channel having sides and bottom, apparatus interposed in the flow of said body for removing debris therefrom, said apparatus including outer side walls facing and spaced from said sides, an upstream outer end wall, a downstream outer end wall and a bottom wall defining a housing, partition walls dividing said housing into first, second and third compartments with openings in said partition walls between said first, second and third compartments, one of said side walls being provided with an intake port for passage therethrough of only small-sized debris and said body of water, said port being adjacent said upstream end wall and said bottom wall; means for barring the passage of other debris in said body from upstream to downstream of said housing and for securing said housing to said sides and bottom of said channel comprising rigid water-tight wings rigid with and extending outwardly and downwardly from said side walls and into said sides and bottom of said channel at locations spaced downstream from the horizontal plane of said port; and said outer downstream end wall having an exit port for debris-free water within said housing; skimming means in said first and second compartments for skimming small-sized debris from the water of said body within said first compartment; and means in said third compartment and carried by said housing for operating said skimming means.

References Cited in the file of this patent

UNITED STATES PATENTS

| | | |
|---|---|---|
| 1,092,440 | Guiu | Apr. 7, 1914 |
| 1,451,394 | Hurst | Apr. 10, 1923 |
| 2,249,049 | Sayers et al. | July 15, 1941 |
| 2,329,295 | Reagan | Sept. 14, 1943 |

FOREIGN PATENTS

| | | |
|---|---|---|
| 18,383 | Great Britain | Nov. 7, 1896 |